Figure 1:
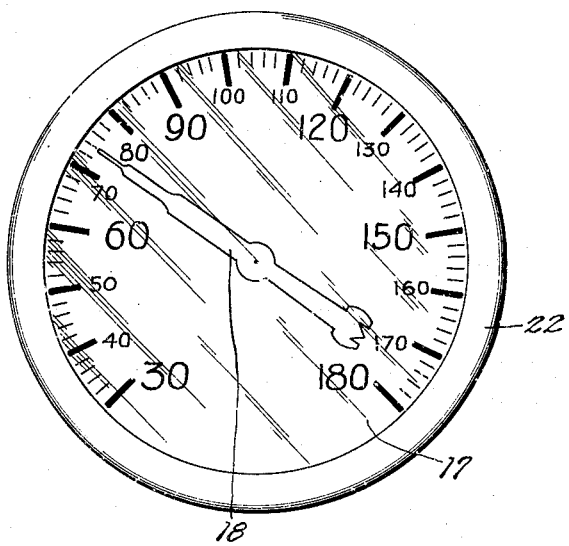

July 1, 1952 A. D. ROSE 2,601,784

DIAL THERMOMETER

Filed July 26, 1946

Inventor.
Alexander D. Rose.
By Thiess, Olson & Mecklenburger.

Patented July 1, 1952

2,601,784

UNITED STATES PATENT OFFICE 2,601,784

DIAL THERMOMETER

Alexander D. Rose, Park Ridge, Ill., assignor to Jas. P. Marsh Corporation, Chicago, Ill., a corporation of Illinois Application July 26, 1946, Serial No. 686,336

3 Claims. (Cl. 73—367)

The present invention relates to a thermometer and has special reference to a dial thermometer in which magnetic means actuated by a thermo-sensitive element or substance transmit the motion of said thermo-sensitive element or substance resulting from temperature changes through an imperforate barrier to an indicator.

More particularly this invention relates to a dial thermometer, which may comprise a thermo-sensitive element such as a bimetallic coil or helix positioned at the inner end of a plug or post and if desired, directly in contact with the fluid whose temperature is to be indicated. One end of the bimetallic helix is fixed with respect to the post. The other end is secured to the inner portion of a stem or other coupling means preferably rotatably mounted in the post and extending therethrough. A permanent magnet mounted for rotation is connected to the outer end of the stem so that movement of the bi-metallic element causes a corresponding rotation of the magnet. An imperforate housing or socket of non-magnetic material fits over the magnet and is secured to the outer end of the post, thereby preventing any escape of fluid through the thermometer. An indicating means is mounted outside the housing and includes an armature or other part of magnetic material for being actuated by movement of the magnet within the housing. A dial or face may be positioned on the outer side of the housing beneath the indicating means. Adjustment of the indicating means with respect to the dial may be readily accomplished merely by axially rotating the thermo-sensitive element and the magnet with respect to the post, socket and dial.

Instead of having the thermo-sensitive element in direct contact with the fluid the temperature of which is to be indicated, a bulb or well member may be provided over the thermo-sensitive element and connected to the post. With this arrangement, the well member may extend through the wall of the fluid container forming a tight seal therewith, and the remainder of the thermometer removed therefrom without permitting the escape of any fluid from the container. If desired, the bulb or well member may be filled with oil or other suitable liquid which, being in direct connection with the bimetallic element, will transfer heat between the wall of the bulb or well and the bimetallic element more rapidly.

An object of the present invention is to provide a dial thermometer in which the actuated mechanism is separated from the indicating mechanism by an imperforate barrier and magnetic means are employed to transmit the motion of the actuating mechanism to the indicating means through the barrier.

Another object of the invention is to provide a dial thermometer of the type indicated above in which the thermo-sensitive element may be directly in contact with the fluid, but the escape of any fluid through the thermometer is prevented.

Still another object of the present invention is to provide such a thermometer which may have a well member removably attached thereto, the well member being adapted to be connected to a fluid container so that the remainder of the thermometer may be removed from the well member as desired without any escape of the fluid from the container.

Still another object is to provide a sensitive dial thermometer of simple construction and wide application.

Figure 2:
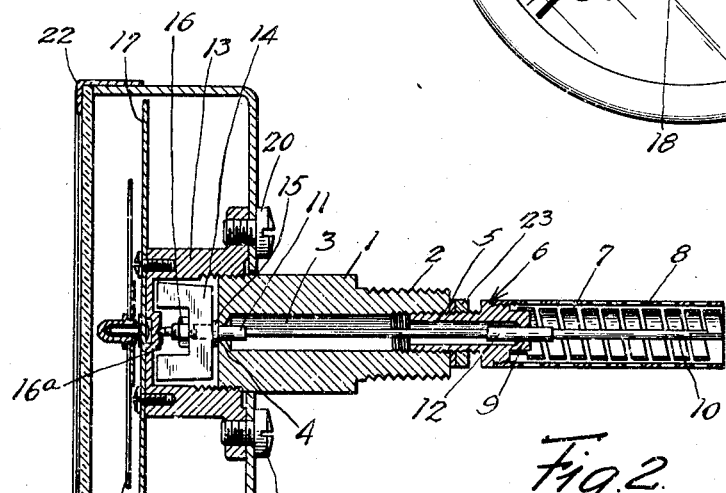
Figure 3:
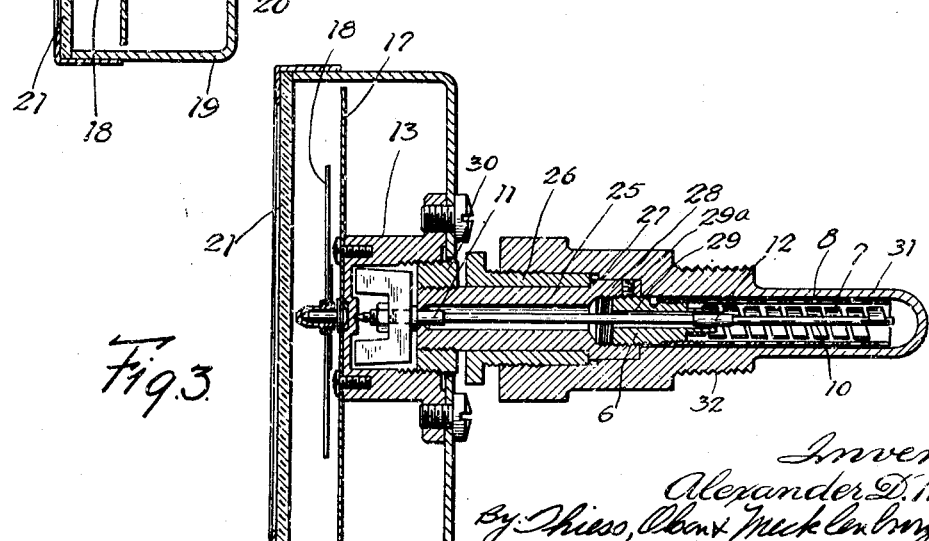

Further objects and advantages will be apparent from the following description and claims when considered with the accompanying drawings, in which Figure 1 is a front plan view of a dial thermometer embodying the present invention;

Fig. 2 is a central, vertical, cross-sectional view, partially in elevation, of one type of thermometer embodying the present invention in which the thermo-sensitive element is to be in direct contact with the fluid, the temperature of which is to be indicated; and Fig. 3 is a central vertical cross-sectional view, partially in elevation, of another type of thermometer embodying the present invention having a well member surrounding the thermo-sensitive element.

Referring more particularly to the drawings, there is shown in Fig. 2 a thermometer comprising a post or body member 1 having a reduced threaded inner end 2 for being threaded into a fluid container. The post 1 is provided with a central longitudinal bore or opening 3 having a reduced bearing portion 4 adjacent the outer end. The inner end of the post 1 is internally threaded for receiving the externally threaded portion 5 of a plug or projecting member 6. A thermo-sensitive element, such as a bimetallic helix 7, is connected at its inner end to the outer end of the projecting member 6. Positioned about the helix is a perforated cylindrical shell 8 connected to the outer end of the projecting member 6 adjacent the reduced bearing portion 9 thereof. The helix 7 and shell 8 are of less diameter than the inner end 2 of the post 1 so they may be inserted into the fluid container through the opening therein provided for the post 1.

Extending through the post 1, plug 6 and helix 7 is a stem 10. The inner end of the stem 10 is fixedly secured to the inner end of the bimetallic helix. Enlarged bearing portions 11 and 12 are provided on the stem 10 for fitting in the bearing portions 4 and 9 of the post and plug respectively.

Secured to the outer end of the post 1 by a fluid tight connection, such as a threaded engagement, there is a socket or housing 13 formed of non-magnetic material. A permanent magnet 14 is positioned within the housing 13 and is fixedly mounted on the outer end of the stem 10. This may be accomplished by passing the stem through the magnet and clamping the magnet between a collar 15 on the stem and a nut 16 threaded onto the end of the stem projecting through the magnet. The projecting end of the stem is centered by engaging the recess 16a therefor in the inner face of the housing 13.

Instead of magnet 14 being directly connected to the outer end of the stem 10 other connecting means may be employed, it being only necessary that movement of the stem be imparted to said magnet by some suitable means. If desired, the magnet may be mounted for rotation about an axis at an angle to the axis of rotation of the stem, there being suitable connecting means provided for connecting the magnet to the stem.

Secured to the outer face of the housing 13 is a dial 17 suitably marked to indicate the range of temperature desired, as shown in Fig. 1. A hand or indicator 18, formed at least in part of magnetic material, or having an armature associated therewith, is rotatably mounted over the dial 17 and is caused to rotate by rotation of the magnet as hereinabove described. A casing 19 is positioned about the dial 17, the hand 18 and the magnet 14, preferably being secured to the rear side of the housing 13 by means of screws 20. The front of the casing is enclosed by a cover glass 21 held in place by a securing ring 22.

A lock nut 23 is provided on the threaded portion of the projecting member 6, which, when screwed tightly against the inner end of the post, will prevent rotation of the projecting member or plug 6 with respect to the post 1. In order to set the hand 18 with respect to the dial 17, the lock nut 23 is loosened and then the plug or projecting member 6 may be rotated with respect to the post.

The construction shown in Fig. 3 is, in many respects, similar to that illustrated in Fig. 2. However, a post 25 as shown in Fig. 3 is provided with an externally threaded ring 26 rotatably mounted on the post and held in position by the shoulder 27 formed by the enlarged inner end 28 of the post 25. The plug or projecting member 29 threads into the outer end of the post 25 and is locked in position by a set screw 29a. An internally and externally threaded nut 30 is employed to secure the housing 13 to the post 25 by a fluid tight connection. Positioned over the thermo-sensitive element 7 and the perforated shell 8, and secured to the ring 26 is a bulb or well member 31. The well member 31 is provided with an externally threaded portion 32 for being threaded into the fluid container. The remainder of the thermometer of Fig. 3 is substantially the same as that shown in Fig. 2.

While I have shown and described two embodiments of the present invention, it is to be understood that various changes and modifications may be made therein without departing from the present invention, and, therefore, I wish to be limited only by the scope of the claims and the prior art.

I claim:

1. A thermometer comprising an elongated tubular post having provision for making a fluid-tight connection with the container of the fluid whose temperature is to be indicated, the outer end of said post having a constricted opening forming a bearing portion, a tubular plug mounted in the inner end of said post and rotatably adjustable with respect thereto, said tubular plug member having a constricted opening at the inner end thereof forming a bearing portion, a thermo-sensitive element arranged adjacent said plug and having one end fixed with respect thereto and rotatable therewith, a magnet mounted for rotation adjacent the outer end of said post, a stem mounted in said bearing portions connected at one end to said thermo-sensitive element and at the other end to said magnet, a housing of non-magnetic material for said magnet in detachable fluid-tight connection with said post, and an indicator outside said housing controlled in its movement by said magnet.

2. A thermometer comprising an elongated tubular post having provision for making a detachable fluid-tight connection with the container of the fluid whose temperature is to be indicated, a tubular plug mounted in the inner end of said post and rotatably adjustable with respect thereto, a thermo-sensitive element arranged adjacent said plug and having one end fixed with respect thereto and rotatable therewith, a magnet mounted for rotation adjacent the outer end of said post, transmission means extending through said plug and said post operatively connected at one end to said thermo-sensitive element and at the other end to said magnet to move said magnet in response to movement of said thermo-sensitive element, a housing of non-magnetic material for said magnet in detachable fluid-tight connection with said post, and an indicator outside said housing controlled in its movement by said magnet.

3. A thermometer comprising an elongated tubular post having provision for making a detachable fluid-tight connection with the container of the fluid whose temperature is to be indicated, a tubular plug mounted in the inner end of said post and rotatably adjustable with respect thereto, a thermo-sensitive element arranged adjacent said plug and having one end fixed with respect thereto, and rotatable therewith, a magnet mounted for rotation adjacent the outer end of said post, a stem extending through said plug and said post operatively connected at one end to said thermo-sensitive element and at the other end to said magnet, a housing of non-magnetic material for said magnet in detachable fluid-tight connection with said post, and an indicator outside said housing controlled in its movement by said magnet.

ALEXANDER D. ROSE.

REFERENCES CITED

The following references are of record in the file of this patent:

UNITED STATES PATENTS

| Number | Name | Date |
|---|---|---|
| 365,905 | Brewster | July 5, 1887 |
| 1,308,435 | Maire | July 1, 1919 |
| 1,657,805 | Norwood | Jan. 31, 1928 |
| 1,787,327 | Schlaich | Dec. 30, 1930 |
| 1,847,006 | Kalischer | Feb. 23, 1932 |
| 1,892,379 | Bolin | Dec. 27, 1932 |
| 1,945,400 | Hastings | Jan. 30, 1934 |
| 2,158,751 | Ford | May 16, 1939 |
| 2,248,030 | Zwack | July 1, 1941 |
| 2,268,006 | Andresen | Dec. 30, 1941 |
| 2,343,372 | Ford et al. | Mar. 7, 1944 |
| 2,365,487 | Murray | Dec. 19, 1944 |
| 2,371,511 | Faus | Mar. 13, 1945 |

FOREIGN PATENTS

| Number | Country | Date |
|---|---|---|
| 749,753 | France | May 8, 1933 |